Jan. 6, 1970   R. HERMAN   3,488,113
OPTICAL PROJECTOR
Filed May 10, 1966   2 Sheets-Sheet 1
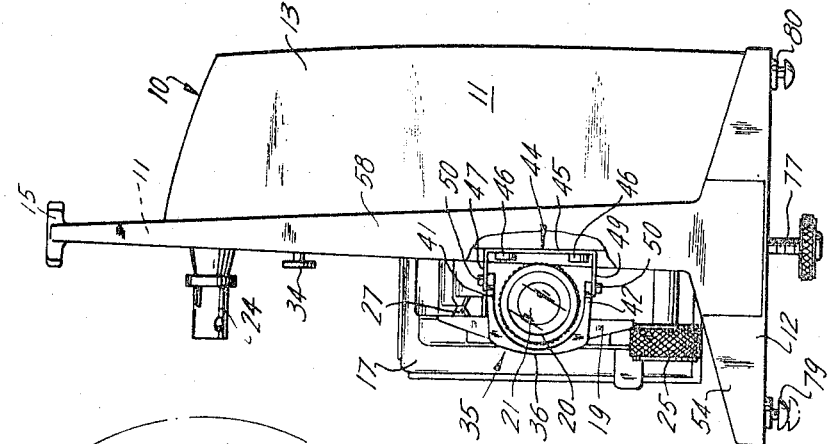
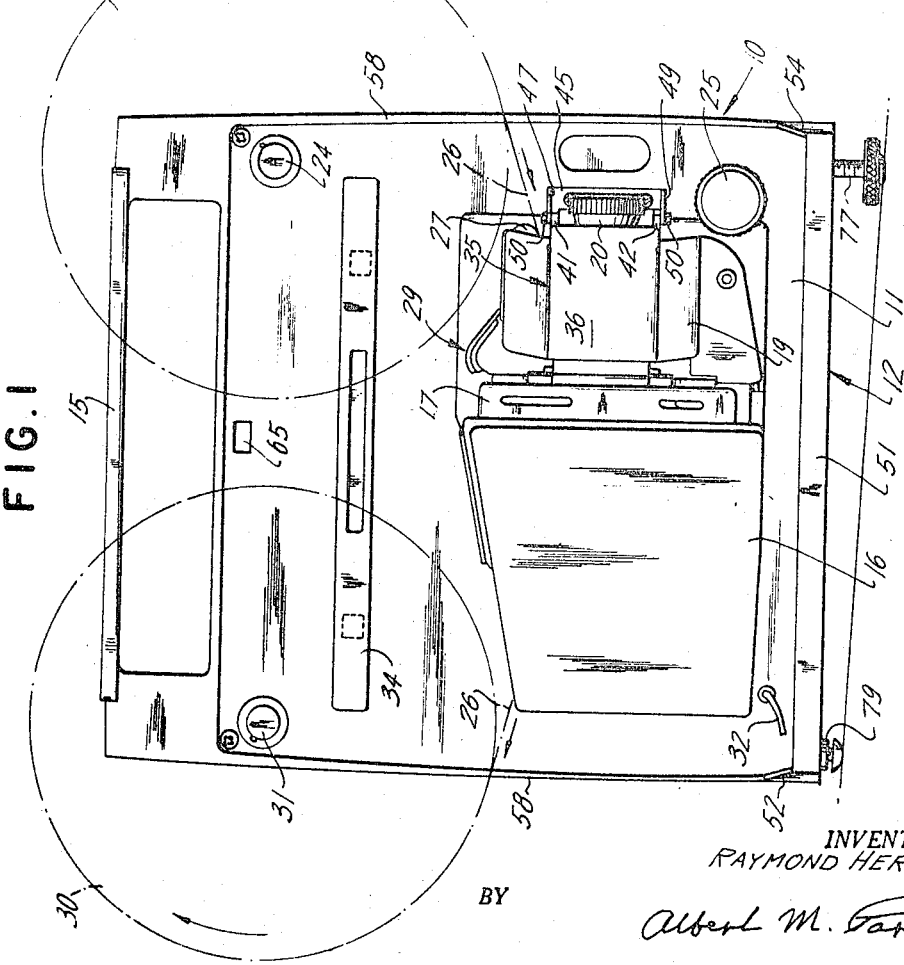
INVENTOR.
RAYMOND HERMAN
BY Albert M. Parker
ATTORNEY

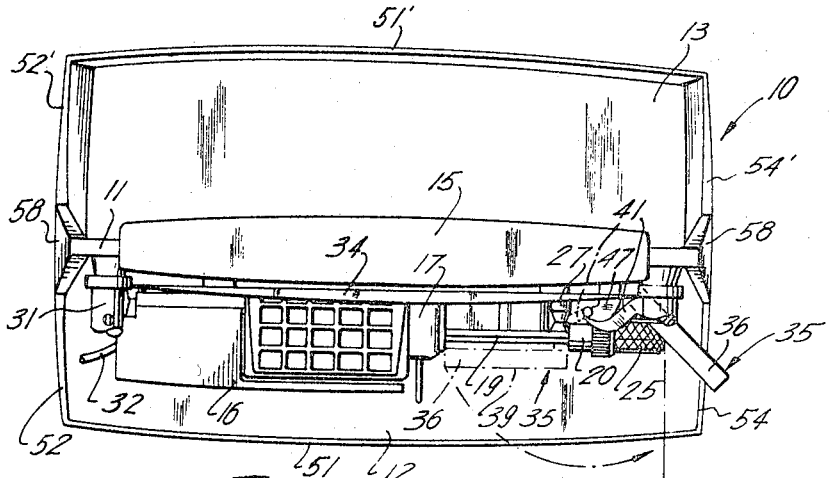
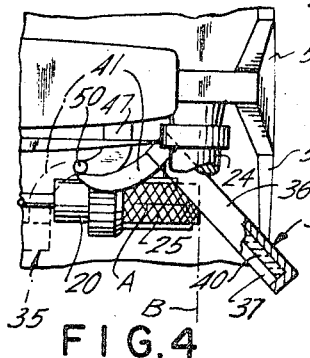
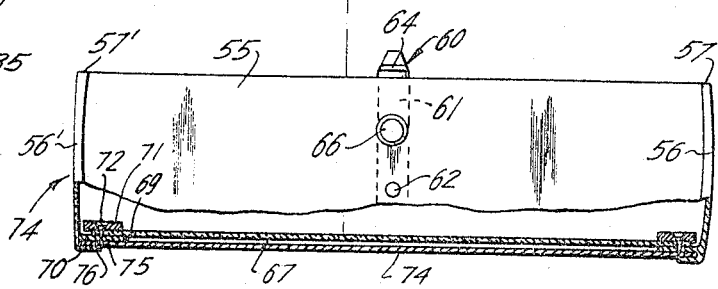
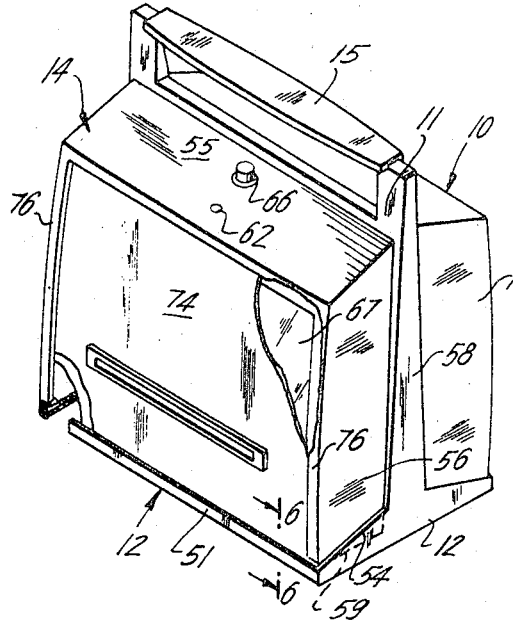
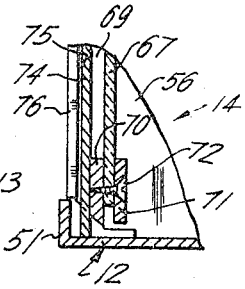
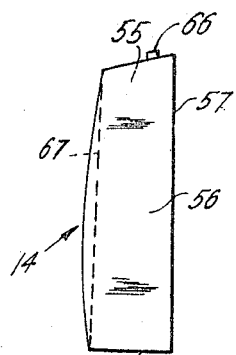

United States Patent Office 3,488,113
Patented Jan. 6, 1970

3,488,113
OPTICAL PROJECTOR
Raymond Herman, North Bellmore, N.Y., assignor to Richmond Research Corporation, Richmond Hill, N.Y., a corporation of New York
Filed May 10, 1966, Ser. No. 549,039
Int. Cl. G03b *21/30*
U.S. Cl. 353—72                5 Claims

ABSTRACT OF THE DISCLOSURE

The projector is constructed to project images on a reflective screen at a distance or on a translucent screen positioned close to the projector so projection can be carried on and the projected images clearly seen without reducing the surrounding light. A mirror is swingably mounted from a position nested alongside of the lens barrel to a position in front of the projection lens and at an angle with respect to the projection path to the reflective screen. The translucent screen is housed in a removable portion of the projector casing, which casing portion also serves as a mounting for positioning and supporting the translucent screen when used for displaying the projected images.

---

The device of the present invention, which is sometimes herein called a reflex projecting device, is illustrated in connection with a motion picture projector. It is to be understood, however, that the invention may be employed with various other types of optical projectors, including those which project still slides upon a reflective screen. The reflex projecting device of the present invention permits the transparencies such as those on the successive frames of a motion picture film to be viewed close to the projector as for the purpose of editing the film. The device, however, may also be employed to advantage where no large reflective screen is available or where the room in which the projector is used is brightly lighted. The system is such that the degree of enlargement of the projected image may be readily changed so that with small projected images the projector may be used in a very brightly lighted room.

In the disclosed preferred embodiment, the translucent screen of the projecting system is disposed as an element of a removable part of the housing of the projector. Such part of the housing is also preferably made self-supporting in vertical position so that it may be readily disposed and supported on the same horizontal surface such as a desk or a table which supports the projector. Preferably, also the projector is provided with a further removable cover plate which may be super-imposed over the translucent screen of the removable cover part so that when the projector is fully housed and is ready to be carried the two side cover portions of the projector appear substantially identical.

The invention has among its objects the provision of a novel optical projector for transparencies, such projector being selectively usable for projection of the transparency upon a reflective screen and for reflex projection thereof upon a smaller translucent screen adjacent the projector.

A further object of the invention lies in the provision of a projector of the type above indicated wherein the reflex projecting means and the translucent screen therefor are provided as attached parts of the projector and the carrying case.

Yet another object of the invention lies in the provision of a projector wherein the size of the projector is little, if any, larger than that of one used for normal straight projection alone and wherein the projector may be readily and quickly changed from normal straight projection to reflex projection.

Still another object of the invention lies in the provision of a novel improved means for supporting the projector whereby the projector may be given the desired inclination relative to its supporting surface both in the longitudinal and lateral directions.

The above and further objects and novel features of the invention will more fully appear from the following description when the same is read in connection with the accompanying drawings. It is to be expressly understood, however, that the drawings are for the purpose of illustration only, and are not intended as a definition of the limits of the invention.

In the drawings, wherein like reference characters refer to like parts throughout the several views, FIG. 1 is a view in side elevation of the projector with the normally removable side of the case thereof removed and with the projector set up for straight projection in the conventional manner;

FIG. 2 is a view in front elevation of the projector as it is shown in FIG. 1 but with the supply and take-up reels and the film strip omitted, the view being taken in the direction from right to left in FIG. 1;

FIG. 3 is a view in plan of the projector as shown in FIG. 2, parts of the projector being broken away for clarity of illustration, the mirror employed for reflex projection being shown extended into operative position and the translucent screen which is incorporated as a part of the removable cover portion being shown receiving a beam of light reflected from such mirror;

FIG. 4 is a fragmentary view in plan of that portion of the projector in the vicinity of the mirror and the mounting means therefor, the view being on an enlarged scale;

FIG. 5 is a view in perspective of the closed projector, corner portions of the case of the projector being broken away for clarity of illustration;

FIG. 6 is a fragmentary view on an enlarged scale in vertical section through one side of the closed projector case, the section being taken along the line 6—6 of FIG. 5 looking in the direction of the arrows; and FIG. 7 is a view in end elevation on a smaller scale of the removable cover portion of the case which carries the translucent screen for reflex projection.

The illustrative projector shown herein is designated generally by the reference character 10. Such projector has a frame including a main vertical plate 11 and a horizontal base plate 12, the plate 11 rising centrally from the base plate. The film traversing mechanism, the driving means therefor, and the film projecting gate are generally the same as those shown and described in applicant's prior application Ser. No. 400,704, filed Oct. 1, 1964, now Patent No. 3,333,915, dated Aug. 1, 1967. The projector here shown has a generally fixed cover portion 13 which encloses the driving motor, blower fan, and a portion of the film traversing mechanism, all of which are not shown herein. The projector when closed has a further cover portion 14 which is disposed on the opposite side of the plate 11 from the cover portion 13. Cover portion 14 is removed when the projector is to be operated, as shown in FIGS. 1, 2, and 3. The upper portion of the central vertical plate 11 is extended at the ends thereof and is bridged by a horizontal handle member 15 by which the projector may be carried.

On the side of the plate 11 which may be closed by the cover portion 14 there are located a lamp housing 16, a film gate housing 17, and a lens mounting member 19 which is pivotally attached to the gate 17 at the rear laterally inner edge of the member 19. Member 19 carries a longitudinally adjustable lens barrel 20, such barrel carrying a lens 21. A film strip supply reel 22 is mounted on a horizontal stub shaft 24 which is mounted at the upper forward corner of the projector proper. As in the Herman application above referred to, the projector is under the control of a knob 25 which permits the selective feeding of the film strip in a forward projecting direction and the rewinding of such strip upon the supply reel 22. During the projecting of the film, the film strip upon leaving the supply reel 22 enters the projector under an upper film guide 27, passes into an upper loop former 29, and by mechanism such as described in the previous Herman application is traversed through the projection gate, and through a lower loop former and a film strip guide, neither of which is here shown, to emerge from such guide in a generally upwardly and rearwardly direction from the end of such guide adjacent the upper rear corner of the light housing 16. In the projecting operation a take-up reel 30 mounted upon a stub shaft 31 at the upper rear corner of the projector proper is driven in a colckwise direction (FIG. 1). Such take-up reel is provided with appropriate film grasping means at its hub so that the film strip is automatically gripped and taken up by the reel 30. The motor (not shown) which drives the projector is powered from an electrical cord 32 which may be wound upon a reel forming bar 34 mounted upon the plate 11 when the projector is not in use.

In the normal or straight projection of pictures from the film strip 26, light from the lamp within the housing 16 passes through a projection aperture in the projection gate 17 through successive frames of the film strip, through the lens 21, and is then projected forwardly upon a vertical screen (not shown) which is spaced a considerable distance from the projector. Because the intensity of light issuing from the lens 21 diminishes as the square of the distance between the light source and such screen, such straight or normal mode of projection must ordinarily be carried out in a darkened room. The reflex projecting device of the invention, now to be described, makes it possible for the projected pictures to be observed close to the projector and thus with a high light intensity. Accordingly, use of such reflex projecting device makes it possible for the projector to be used in normally lighted rooms. Not only that, but the projector and its reflex screen when thus used requires only a relatively small supporting area so that such reflex projection may be carried out in a small room and in other locations where a conventional large vertical screen is not available.

The reflex projecting means of the present invention has two main elements: A reflecting device or mirror which diverts the beam of light issuing from the lens 21 so that it then passes at a marked angle, such as a right angle, relative to the optical axis of the lens, and a translucent viewing screen adapted to be placed close to the projector so as to receive the thus diverted beam and to permit the viewing of the pictures from the side of such screen away from the projector.

The first such part of the reflex projecting means of the invention is shown in FIGS. 1 and 2, the combination of such two parts positioned in operative relationship is shown in FIG. 3. The beam diverting member, which here is in the form of a mirror, is generally designated by the reference character 35. Means 35 has an elongated body 36, the outer surface of which is generally in the form of a part of a horizontally extending circular cylinder of large radius. The inner surface 37 of body 36 is likewise in the form of a part of a circular cylinder, such cylinder having a radius such that when the device 36 is folded or retracted into its inoperative position as shown in FIGS. 1 and 2 the surface 37 closely overlies and is parallel to the outer surface 39 of the central portion of the lens mounting device 19.

Body 36 carries a flat mirror 40 which is disposed in a vertical plane. Mirror 40, in the illustrative embodiment, is in the form of a glass plate silvered on its rear surface, and thus totally reflects light which is incident thereon. Body 36 may, as indicated, be pivoted from the retracted, inoperative position of FIGS. 1 and 2 into the extended operative position of FIG. 3. To permit this the body 36 is provided with a yoke having parallel upper and lower legs 41 and 42, respectively, at its upper and lower laterally inner corners. As shown in FIG. 1, when the device 35 is in its inoperative position such legs 41 and 42 are positioned above and below and somewhat rearwardly of the forward end of the lens barrel 20; it will be seen that neither the body 36 nor the legs 41 and 42 present any interference to the forward passage of light from the lens. Also, the forward ends of the lens is freely exposed between the legs 41 and 42, for the ready focusing of the lens. The inner or free ends of the legs 41 and 42 are mounted upon a bracket 44 having a base 45 which is supported on the side surface of plate 11 and secured thereto by machine screws 46. Bracket 44 has upper and lower arms 47 and 49, respectively, between which the legs 41 and 42 of the body 36 are disposed. Such arms of the brackets and legs of the body 36 are connected by coaxial upper and lower pivot pins 50.

The frame of the projector 10 is provided with flanges on both sides thereof, and the cover portions 13 and 14 are symmetrical so that when the projector is fully closed it has virtually the same appearance on both sides. Rising from the base 12 of the projector frame are rims or upstanding flanges, the elongated flange along the side of the projector receiving the removable cover 14 being designated 51 and those on the rear and front ends of the projector on such side thereof being designated 52 and 54, respectively. When the removable cover portion 14 is positioned on the projector as shown in FIG. 5, the lower edges of such cover portion are received on the upper surface of the base 12 inwardly of such lower flanges. The cover portion 14 is provided with a top 55 and with forward and rear ends 56 and 56', respectively, which lie parallel to each other.

As shown more particularly in FIG. 7, the laterally inner vertical edges 57 of ends 56 and 56' of the portion 14 of the case lie vertical and the lower edges 59 of such ends 56 lie horizontal. Such lower edges 59 thus constitute spaced supports or feet for the cover portion 14 when it is removed from the projector and is functioning as a reflex screen, as shown in FIG. 3. Case portion 14 is retained in closed position upon the projector by the aforementioned interfitting of the lower edges of such case portion within the lower upstanding flanges on the frame 12, by the reception of the vertical edge portions 57 of the sides 56 and 56' between the respective end flanges 58 on the plate 11 of the projector, and by a latch means on the top of portion 14 coacting with the frame of the projector. Such latch means, which is generally designated 60, is shown in FIG. 3; it is composed of a spring metal strip 61 which underlies the top 55 of portion 14 of the case and is secured thereto at its laterally outer end by a rivet 62. The laterally inner end of strip 61 is bent upwardly and then downwardly to form a detent 64, such detent being receivable within an opening 65 in the upper edge of the plate 11 of the projector when cover portion 14 is in closed position on the projector upon the swinging of the top of portion 14 laterally inwardly, the latch snapping inwardly past the upper edge of opening 65, thereby to prevent the removal of the portion 14 of the case. The inner end of strip 61, and thus the latch 64, may be freed from the opening 65 by pressing downwardly upon an upstanding button 66 which extends upwardly from the spring strip 61 through the top 55 of portion 14 of the case.

As shown in FIG. 3, when the projector is to be set up for reflex projection, the cover portion 14 is removed therefrom and is placed at a desired angle with respect to the projector. In FIG. 3, portion 14 is shown positioned with the broad surface thereof parallel to the optical axis of the projector and with the mirror device 35 extended to lie at 45° with respect to such axis. It will be understood that, if desired, the mirror device 35 may be extended at angles somewhat less than 45° relative to the optical axis of the projector and the cover portion 14 then being positioned relative to the projector so that the incident projected beam A of light from the lens thereof forms an angle with the mirror which equals the angle at which the reflected beam B of light makes with the mirror. When the mirror is thus positioned, the forward end of the lens is readily accessible for any necessary adjustment.

The cover portion 14 is provided with a translucent screen 67 which extends across substantially the full width and height of the broad side surface of the portion 14 of the case. As shown in FIG. 6, the ends and top of the case portion 14 are provided with flanges, the inner edges of such flanges defining an aperture 69. The flanges which project inwardly from the end walls 56 and 56' are designated 70. The translucent screen 67 is of such size as to overlap such upper and end flanges, and is secured to the flanges by an inner bordering frame 71, screws 72 clamping the edges of the translucent screen between the flanges 70 and the frame 71.

In order to cover the translucent screen 67 and protect it from injury when not in use, the portion 14 of the case is provided with a removable protective panel or plate 74 which lies outwardly of the screen 67. Plate 74 is retained by upper and end channels in the cover portion 14, such channels being disposed parallel to and outwardly of the screen 67. Thus the top and end edges of the case are provided with further external flanges of which the end flanges 76 are shown in FIGS. 3 and 6; such outer flanges present, with the inner flanges, inwardly open channels of which the vertically extending channels are designated 75. When the cover portion 14 is mounted upon the projector as shown in FIG. 5, the lower edge of the covering plate 74 abuts the upper surface of the base 12 of the projector, thereby retaining the plate 74 in place. When, however, cover portion 14 is removed from the projector, the plate 74 may be removed therefrom by being slid downwardly in the vertical end channels 75.

The illustrative projector is provided with novel means whereby it may be suitably adjusted relative to its supporting surface in directions both longitudinally and laterally of the projector. Thus, at the forward end of the projector there is provided a laterally centrally disposed adjustable foot 77 whereby the longitudinal inclination of the projector may be adjusted as desired. The rear of the base 12 of the projector is provided with symmetrically laterally disposed rear feet 79 and 80, respectivaly, of which at least one, here shown at 79, is vertically adjustable. The described adjustable supports for the projector thus provide not only for the conventional longitudinal tipping of the projector but also permit its lateral inclination to be suitably adjusted. This is especially desirable when the projector is used for reflex projection, since the support upon which the projector and the removed cover portion 14 are disposed may not be horizontal nor smooth. Thus in some instances it may be necessary, when the projector is disposed as shown in FIG. 3, to tip the projector in one direction or the other in order to center the reflected beam B upon the translucent screen 67.

The advantages of the projector of the present invention have in the main been pointed out above. The projector itself contains all the parts which are necessary for its use in reflex projection. It may be readily set up and may be employed in a brightly lighted room. Consequently, it is admirably suited for sales presentations. The mirror device 35 turns the image end for end in a horizontal direction so that the projected image appears correctly when viewed on the side of the translucent screen 67 remote from the projector. Thus, such projected image may be readily seen by a number of people seated at convenient angles with respect to the screen.

Although only one embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art. Thus although the mirror 40 is shown and described as being totally reflective, it is to be understood that, if desired, it may be only partially reflective, that is, it may pass a predetermined percentage of the incident light directly through it and reflect the remainder. In such case, the projected image may be viewed, although with decreased intensity, on both the translucent screen, by reflex projection, and on a large reflective screen, by straight or direct projection.

What is claimed is:

1. A projector comprising means for supporting an element bearing an image to be projected, a light source positioned to direct projecting light against such image on the element, means to direct light from said source after its impingement upon such image along a first path so that it may be received upon a reflective screen, means selectively operable to intercept said light after its impingement upon the image and to forward said intercepted light at a substantial angle relative to said first path, a case for housing said projector, means for readily removably mounting a portion of said case on said projector, a translucent screen for receiving said thus forwarded intercepted light, means for mounting said translucent screen within said removable portion of said case, said removable portion of the projector case having an upwardly extended wall and at least one foot extending from said wall whereby the said removable portion of the case is self-erecting on a generally horizontal supporting surface, an aperture formed in such upwardly extending wall, said translucent screen being mounted on said extending wall overlying said aperture therein, a removable protective cover plate adapted to overlie the translucent screen on the removable portion of the projector case, and means to retain said cover plate on such portion of the case.

2. A projector as claimed in claim 1, wherein the cover plate retaining means comprises opposed channels on said removable portion of the case bordering said translucent screen thereon, said channels slidingly receiving opposite edges of said cover plate.

3. A projector as claimed in claim 2, wherein said extended wall of the removable portion of the projector case lies generally vertical, said channels border the opposite vertical edges of said translucent screen, and comprising means retaining said cover plate against sliding in either vertical direction in the channels when the removable cover portion is mounted on the projector.

4. In a projector for projecting images carried by transparent film along one path directly onto a reflective screen at a distance, or by reflection along another path onto a translucent screen, a frame, a housing providing a film gate carried by said frame, a lens barrel carried by said frame in advance of said film gate housing, a projection lens carried by said lens barrel and a mirror swingably mounted for movement into retracted position closely alongside of said lens barrel to operative position across the projection path from said lens to said reflective screen, and means for mounting said mirror for said swingable movement, said mounting means comprising a pair of spaced legs forming a yoke, said legs formed to extend across above and below said lens barrel, the outer ends of said legs mounting said mirror therebetween, and pivot means carried by said frame on the side of said lens barrel opposite said mirror when said mirror is in retracted position, for the pivotal mounting of said legs for swinging movement in planes parallel to the axis of said lens, the inner ends of said legs being carried by said pivot means.

5. In a projector as in claim 4, said legs, when said mirror is in operative position lying between said lens barrel and said frame.

References Cited

UNITED STATES PATENTS

| | | |
|---|---|---|
| 1,818,355 | 8/1931 | Readeker. |
| 2,345,202 | 3/1944 | Larson. |
| 2,575,579 | 11/1951 | Bullock et al. |
| 3,143,036 | 8/1964 | Rohmann. |

FOREIGN PATENTS 216,605    8/1958    Australia.

NORTON ANSHER, Primary Examiner

R. P. GREINER, Assistant Examiner

U.S. Cl. X.R.

353—98